US010617097B2

United States Patent
Whitney

(10) Patent No.: US 10,617,097 B2
(45) Date of Patent: Apr. 14, 2020

(54) DRIPLESS DOG BOWL

(71) Applicant: Charles T. Whitney, Jupiter, FL (US)

(72) Inventor: Charles T. Whitney, Jupiter, FL (US)

(*) Notice: Subject to any disclaimer, the term of this patent is extended or adjusted under 35 U.S.C. 154(b) by 352 days.

(21) Appl. No.: 15/640,633

(22) Filed: Jul. 3, 2017

(65) Prior Publication Data
US 2019/0000038 A1    Jan. 3, 2019

(51) Int. Cl.
| | |
|---|---|
| *A01K 7/00* | (2006.01) |
| *A01K 5/01* | (2006.01) |
| *B65D 21/02* | (2006.01) |
| *B65D 47/12* | (2006.01) |
| *B65D 53/02* | (2006.01) |

(52) U.S. Cl.
CPC ............ *A01K 7/005* (2013.01); *A01K 5/0135* (2013.01); *B65D 21/0209* (2013.01); *B65D 47/12* (2013.01); *B65D 53/02* (2013.01)

(58) Field of Classification Search
CPC ............................... A01K 7/005; A01K 5/0135
See application file for complete search history.

(56) References Cited

U.S. PATENT DOCUMENTS

| | | | |
|---|---|---|---|
| 968,613 A | 8/1910 | Van Ostrand | |
| 4,286,546 A * | 9/1981 | Moore | A01K 7/005 119/61.54 |
| 5,297,504 A * | 3/1994 | Carrico | A01K 7/005 119/61.54 |
| 5,738,039 A | 4/1998 | Berman et al. | |
| 5,791,287 A | 8/1998 | Gruber | |
| 5,881,670 A | 3/1999 | Pelsor | |
| 6,079,361 A | 6/2000 | Bowell et al. | |
| 6,142,101 A * | 11/2000 | Pelsor | A01K 5/0135 119/61.54 |
| 6,928,954 B2 | 8/2005 | Krishnamurthy | |
| 7,017,518 B2 | 3/2006 | Zolnierz et al. | |
| 7,089,881 B2 | 8/2006 | Plante | |
| D538,981 S * | 3/2007 | Skowronski | D30/132 |
| 7,270,082 B2 | 9/2007 | Plante | |
| 7,487,741 B2 | 2/2009 | Jordan | |
| 7,634,973 B1 | 12/2009 | Cribb et al. | |
| 8,397,676 B2 | 3/2013 | Whitney | |
| 2007/0199512 A1 | 8/2007 | Ellis | |
| 2016/0229590 A1 | 8/2016 | Smaldone et al. | |

FOREIGN PATENT DOCUMENTS

| | | |
|---|---|---|
| GB | 987774 A | 3/1965 |
| GB | 2352610 | 7/2001 |
| WO | WO2010115221 | 10/2010 |

* cited by examiner

*Primary Examiner* — Monica L Williams
(74) *Attorney, Agent, or Firm* — McHale & Slavin, P.A.

(57) ABSTRACT

An improved drip preventing container for dispensing limited amounts of a liquid to an animal which is adaptable for use with animals, such as dogs, having breeds of different sizes. The drip preventing container for dispensing limited amounts of a liquid to an animal generally comprises a top portion which can be configured to be useful for different sized animals and is constructed and arranged to engage a bottom portion. The drip preventing container further contains an animal access chamber constructed and arranged to prevent large amounts of water from being stored within the chamber and for reducing splashing water from exiting the device while the animal is drinking.

14 Claims, 13 Drawing Sheets

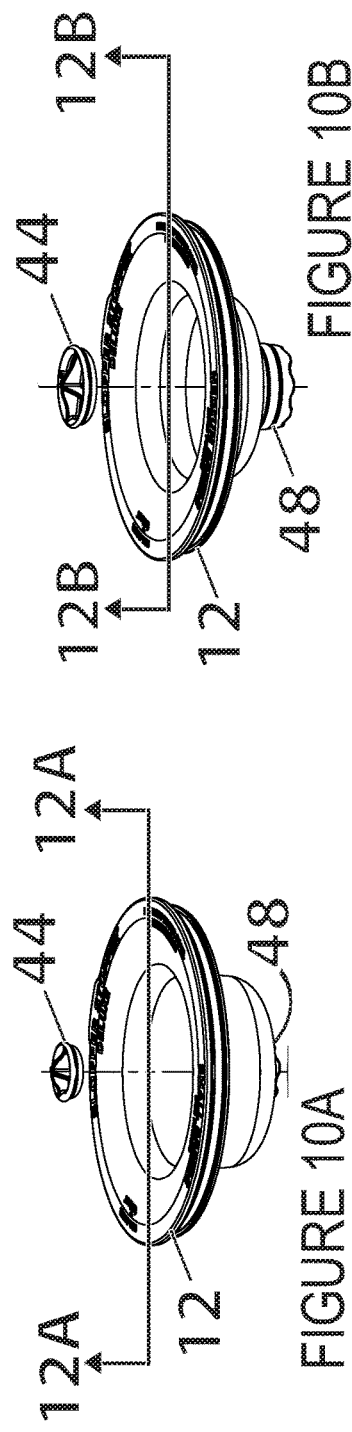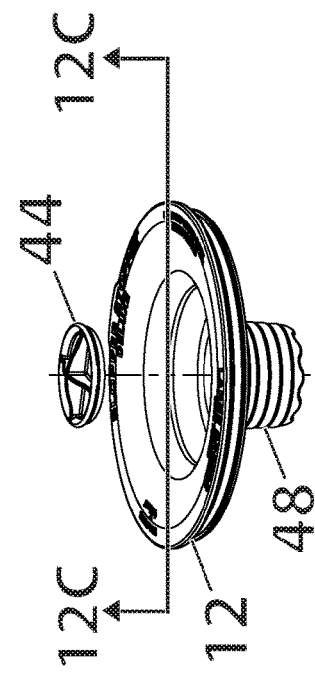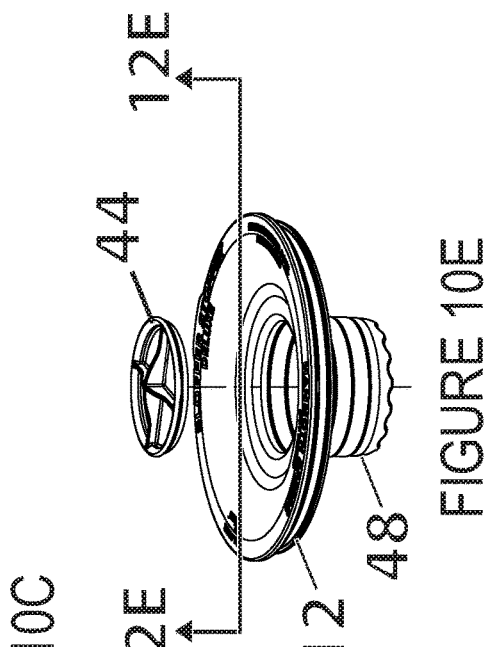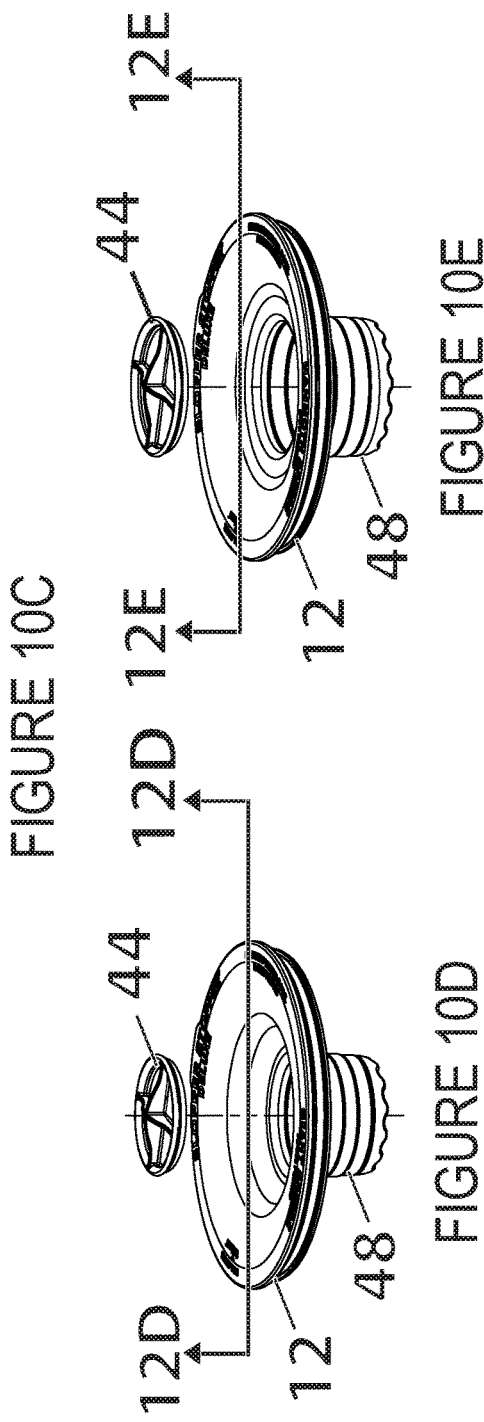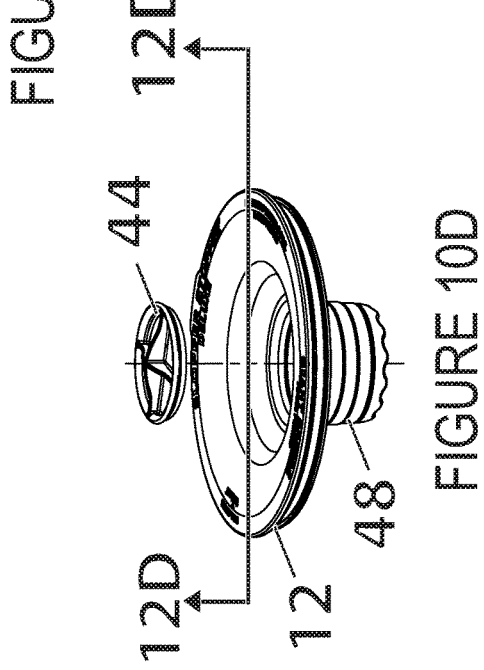
FIGURE 10A
FIGURE 10B
FIGURE 10C
FIGURE 10D
FIGURE 10E

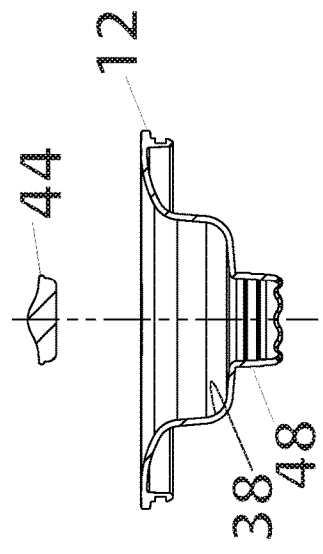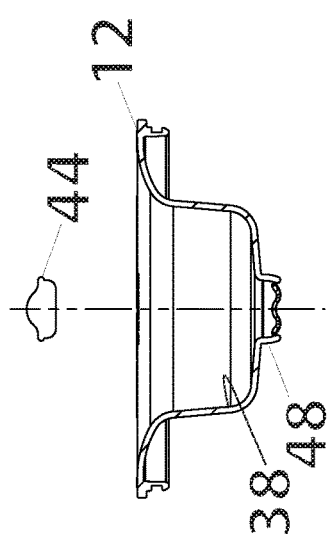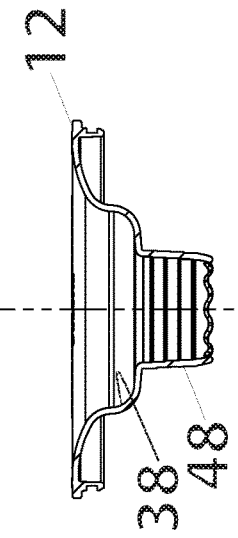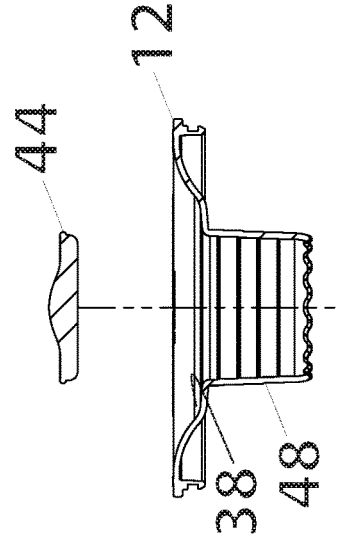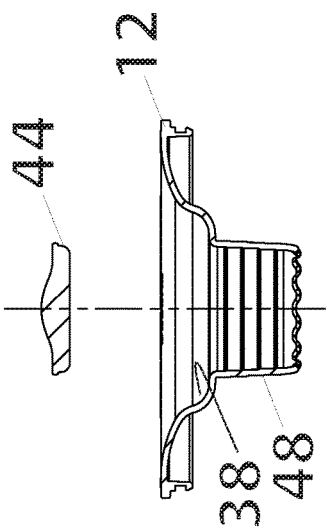

DRIPLESS DOG BOWL

FIELD OF THE INVENTION

The invention relates to pet supplies, and more particularly to a drinking and/or feeding bowl adapted for providing an animal a source of nutritional solids or liquid, and more specifically to an improved drinking bowl for use by animals of different sizes having a first section engagable with a second section to enclose a liquid material, such as water, wherein the liquid material is controllably obtained by a dog in such a manner that excess liquid formed as a result of drinking is minimized or prevented, thereby preventing the formation of trails of liquid to surrounding areas.

BACKGROUND OF THE INVENTION

Many households have one or more domesticated animals living within. In fact, many animal owners develop such a bond with domesticated animals, such as dogs and cats, that they are often considered as part of the family. While these animals provide benefit to humans, such as companionship and protection, a large amount, of care is required in order to ensure that the animals develop properly and live healthy lives. While pack animals, such as dogs, require companionship, all animals rely on their human caretakers to provide them the basic necessity of food. In addition to food, all animals require a certain amount of fluids, such as water, for their well-being and maintenance of a healthy lifestyle. Since most animals are kept within a home and do not possess the ability to obtain water from a sink, they rely on their caretakers to supply a constant source of fresh water.

The most common form of providing water is through the use of container devices, such as water bowls. These devices are easy to use and maintain, as the caretaker simply places the liquid within the bowl for the animal to drink at will. Any trip to a pet store or search online will reveal that there are numerous types of water bowls available for purchase and use. Water bowls come in many shapes and sizes, and have been designed to provide several functions, including bowls that automatically dispense liquid within the bowl, bowls that aerate water, bowls that slow down the rate at which the animal drinks, and bowls that prevent large amounts of water from spilling if the dog overturns the bowl.

While these dog bowls solve some common problems associated with their use, one issue not fully addressed is the problem of slope. Slopp refers to the mess made by the dog as the animal drinks or splashes from a water bowl. Such mess may also be generated as the dog stops drinking from the bowl and leaves a trail of water coming from the animal's lips, ears snout, tongue or beards. As most dog owners are aware, as the dog drinks from a bowl, not all the water the animal comes in contact with makes it into the mouth and is digested. Instead, depending on the size of the dog, large amounts of water spill all over the area near the bowl. Moreover, as the dog moves away from the watering spot, any water left attached to his/her ears, snout, beard or tongue follows the dog, leaving a trail of water all over the floor. To avoid slipping and falling, the dog owner must constantly clean up the resulting water trail.

Therefore, what is needed in the art is an animal drinking bowl that provides the animal with a non-limiting source of liquid, which is constructed and arranged to prevent or limit the amount of water that stays on the dog's snout, in his mouth and tongue, on his ears or on his beard from contacting the surrounding area. In addition, a drinking bowl which can be adapted to accommodate animals of different sizes having different physical characteristics is needed.

DESCRIPTION OF THE PRIOR ART

Devices that are capable of holding a source of liquids for animals not new in the art. U.S. Pat. No. 8,397,676 discloses a drinking container designed to prevent an animal from drooling or splashing excessive amounts of a liquid to the surrounding area. The '676 patent describes a system that functions in a similar manner; the functionality is achieved by using several different components. The '676 patent also describes various prior art devices capable of holding a source of liquids for animals.

U.S. Pat. No. 968,613 discloses a water trough for stock farm, especially intended for watering sheep. Related to domestic animals, U.S. Pat. No. 5,791,287 discloses a vessel for transportation of water for animals which resists splashing while offering easy access to the water by the animal. U.S. Pat. No. 5,881,670 discloses a splash and spill-resistant container for holding fluids for animal consumption. U.S. Pat. No. 5,738,039 discloses a bowl for supplying drinking water to a pet.

U.S. Pat. No. 6,079,361 discloses an animal watering system. The system includes a storage device that has a bottom, a top, a mouth located within the top, a plurality of sides, and a drinking device that is designed to dispense a liquid and to receive the bottom of the storage device. The storage device includes a selectively openable and closable port system and a sealing mechanism for sealing the mouth of the storage device. U.S. Pat. No. 6,928,954 discloses a pet watering system which includes a refillable reservoir for holding water using a pump to circulate water between a base and the bowl.

U.S. Pat. No. 7,017,518 discloses a device and method for creating an improved feeding bowl assembly by attaching a guard device to a pet feeding bowl. The guard device is described to prevent food or water from being splashed out of the feeding bowl by the pet. U.S. Pat. Nos. 7,089,881 and 7,270,082 disclose a pet drinking fountain having a well housing, a water filter and pump, and a water tank mounted on the base.

U.S. Pat. No. 7,487,741 discloses a pet water dish designed to retain water when repeatedly overturned. U.S. Pat. No. 7,634,973 discloses a pet bowl assembly for traveling in a vehicle having a container for holding water, a bowl having a bowl base and vertical wall projecting upwards from a perimeter of the base, a removably attached container secured to the bottom of the bowl base, and a lid removably attached to the top of the bowl.

United States Published Application No. 2007/0199512 discloses a drinking bowl for a pet for use in a moving vehicle. The bowl has a base section which contains a liquid reservoir having a cylindrical side wall and a removable in-turned rim at the upper end thereof. United Kingdom Application No. 2352610 discloses a double-walled container and a non-leaking lid having an open area for pet to access drinking water in the bowl. The lid has a semi-circular construction to direct water back into the bowl.

SUMMARY OF THE INVENTION

The present invention describes an improved dripless water bowl configured for dispensing limited amounts of a liquid to an animal which is adaptable for use with animals, such as dogs, having breeds of different sizes. As used herein, the term "dripless" refers not to the actual prevention of drip from the bowl, but to reducing or eliminating the amounts of water spill all over the area near the bowl generally associated with dogs as they drink from the bowl. The term may also refer to preventing water created as the dog moves away from the watering spot, in which any water left attached to his/her ears, snout, beard or tongue follows the dog, leaving a trail of water all over the floor. To avoid slipping and falling, the dog owner must constantly clean up the resulting water trail. The dripless container for dispensing limited amounts of a liquid to an animal generally comprises a top portion, which can be configured to be useful for different sized animals, and is constructed and arranged to engage a bottom portion. The dripless container further contains an animal access chamber constructed and arranged to prevent large amounts of water from being stored within the chamber and for reducing splashing water from exiting the device while the animal is drinking. The animal access chamber has a main body defined by a first end extending from an opening positioned along the top portion, and a second end. The second end of the animal access chamber terminates in an aperture.

In one embodiment, the drip preventing container for dispensing limited amounts of a liquid to an animal comprises an upper portion constructed and arranged to sealably engage a bottom portion, the upper portion having an aperture, a bottom portion defined by a first open end constructed and arranged to sealably engage the upper portion, a second end defined by a bottom wall, and a side wall linking the first end and the bottom wall to define a reservoir for holding a liquid; wherein sealable engagement of the upper portion with the bottom portion defines a dripless container constructed and arranged for providing an animal access to a limited amount of liquid stored within the reservoir for holding a liquid, thereby preventing or limiting excess water formation as the animal drinks therefrom; and an animal access chamber having a main body defined by a first end extending from the upper portion aperture, a second end positioned towards the bottom wall of the bottom portion and terminating in an animal access chamber aperture, and a side wall therebetween, the main body constructed and arranged to prevent the excess liquid from exiting the drip preventing container as the animal drinks. The upper portion may further comprise an inwardly sloped surface and a concave surface, wherein the concave portion is adjacent to and extends from the inwardly sloped portion. The drip preventing container for dispensing limited amounts of a liquid to an animal may also include an animal access chamber defined by a ratio of animal access chamber diameter:animal access chamber depth:animal access chamber water height. The dripless water container for dispensing limited amounts of a liquid to an animal may further comprise a plug sized and shaped to engage with said upper portion aperture.

In another embodiment, the dripless water container for dispensing limited amounts of a liquid to an animal comprises an upper portion constructed and arranged to sealably engage a bottom portion, the upper portion having a concave surface terminating in a centrally positioned aperture, a bottom portion defined by a first open end constructed and arranged to sealably engage the upper portion, a second end defined by a bottom wall, and a side wall linking said first end and the bottom wall to define a reservoir for holding a liquid; wherein sealable engagement of said upper portion with the bottom portion defines a drip preventing container constructed and arranged for providing an animal access to a limited amount of liquid stored within the reservoir for holding a liquid, thereby preventing or limiting excess water drip or formation as the animal drinks therefrom; and an animal access chamber comprising a main body constructed and arranged to prevent said excess liquid from exiting the dripless water container as the animal drinks, the main body having a first end extending from the upper portion aperture, a second end positioned towards the bottom wall of said bottom portion and terminating in an aperture, and a side wall therebetween. The animal access chamber is defined by a ratio of animal access chamber diameter:animal access chamber depth:animal access chamber water height. The dripless container for dispensing limited amounts of a liquid to an animal may include an animal access chamber diameter:animal access chamber depth:animal access chamber water height ratio, in inches, which is about 1.5 to about 3.75:about 0.66 to about 2.85:about 0.40 to about 0.51. The dripless container for dispensing limited amounts of a liquid to an animal may further comprise a plug sized and shaped to engage with said upper portion aperture.

Accordingly, it is an objective of the invention to provide an improved drinking container which is constructed and arranged to prevent an animal from slopping or splashing excessive amounts of a liquid to the surrounding area.

It is a further objective of the invention to provide a drinking container which is constructed and arranged for use with variously sized animals.

It is yet another objective of the invention to provide a drinking container which uses an upper portion that can be modified to accommodate animals of different sizes while maintaining an ability to limit the amount of liquid at or below an animal access chamber.

It is yet another objective of the invention to provide a drinking container which uses an upper portion that can be modified to accommodate animals of different sizes while maintaining an airtight chamber when the container is filled with the liquid.

It is a still further objective of the invention to provide a drinking container which uses an upper portion that can be modified to accommodate animals of different sizes while maintaining an ability to form an internal vacuum when the container is filled with the liquid.

It is a further objective of the instant invention to provide a drinking container which uses an upper portion that can be modified to accommodate animals of different sizes while maintaining an ability to dispense a continuous supply of a liquid to an animal for drinking while simultaneously reducing the amount of excessive liquid which is splashed or slopped to the surrounding area.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 10A is a perspective view of the upper portion of the drip preventing container for use with small breed dogs;

FIG. 10B is a perspective view of the upper portion of drip preventing container for use with medium breed dogs;

FIG. 10C is a perspective view of the upper portion of the drip preventing container for use with large breed dogs;

FIG. 10D is a perspective view of the upper portion of the drip preventing container for use with giant breed dogs;

FIG. 10E is a perspective view of the upper portion of the drip preventing container for use with mammoth breed dogs;

FIG. 12A is a cross sectional view taken along lines 12A-12A of FIG. 10A;

FIG. 12B is a cross sectional view taken along lines 12B-12B of FIG. 10B;

FIG. 12C is a cross sectional view taken along lines 12C-12C of FIG. 10C;

FIG. 12D is a cross sectional view taken along lines 12D-12D of FIG. 10D;

FIG. 12E is a cross sectional view taken along lines 12E-12E of FIG. 10E;

DETAILED DESCRIPTION OF THE INVENTION

Figure 1:
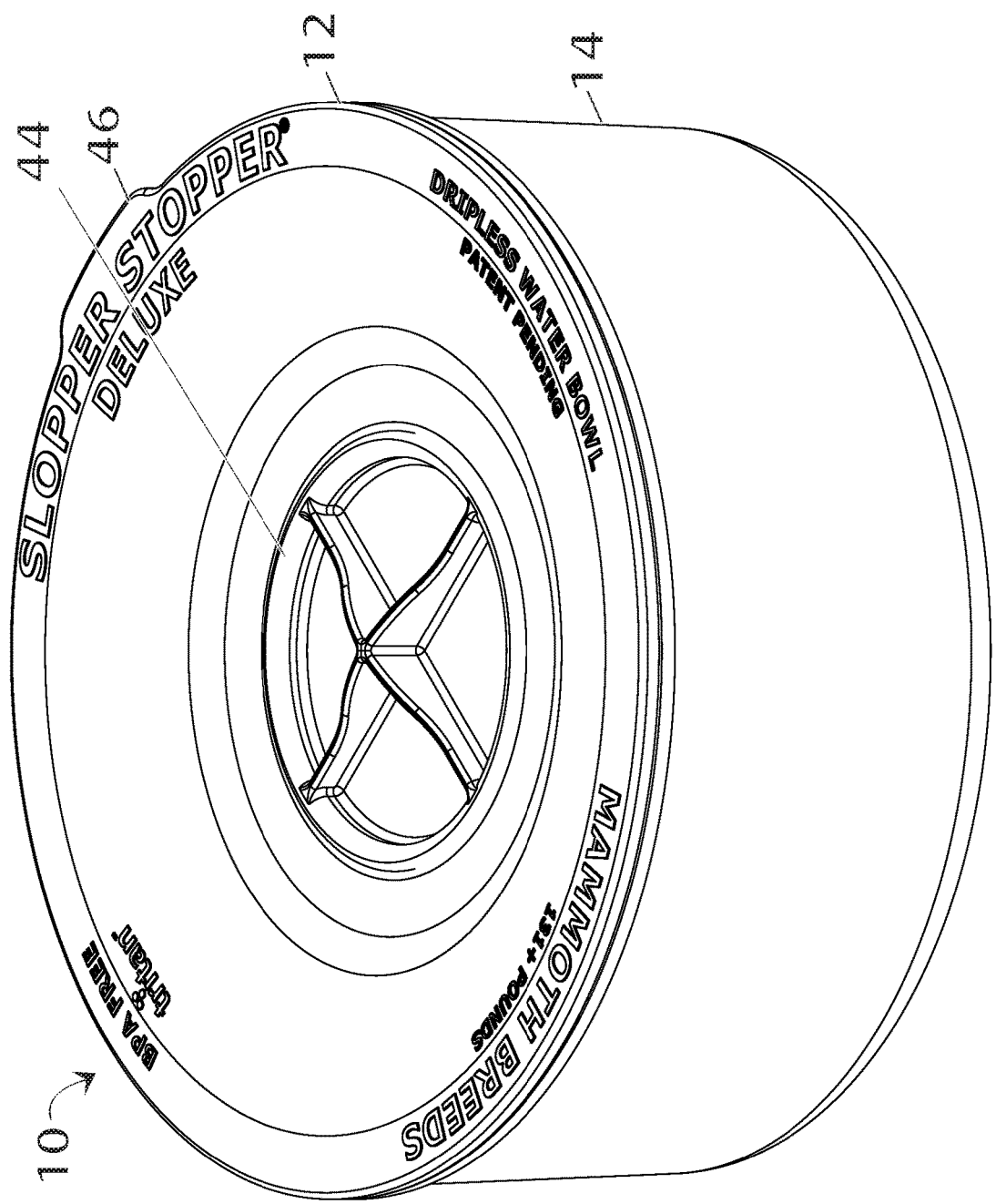
FIG. 1 is a perspective view of an illustrative embodiment of the drip preventing container of the present invention.
Figure 2:
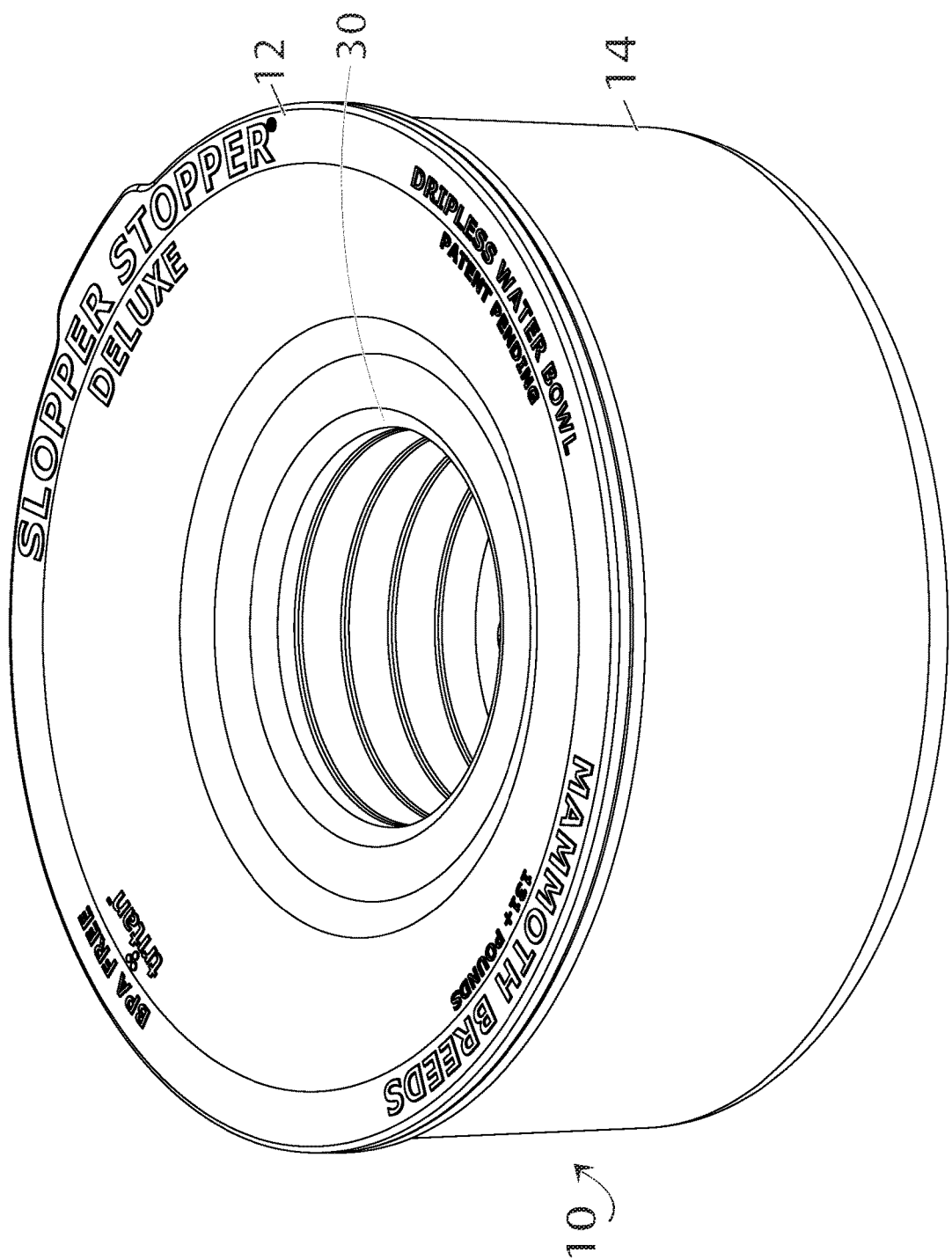
FIG. 2 is a perspective view of the drip preventing container shown in FIG. 1 without a top wall plug.
Figure 3:
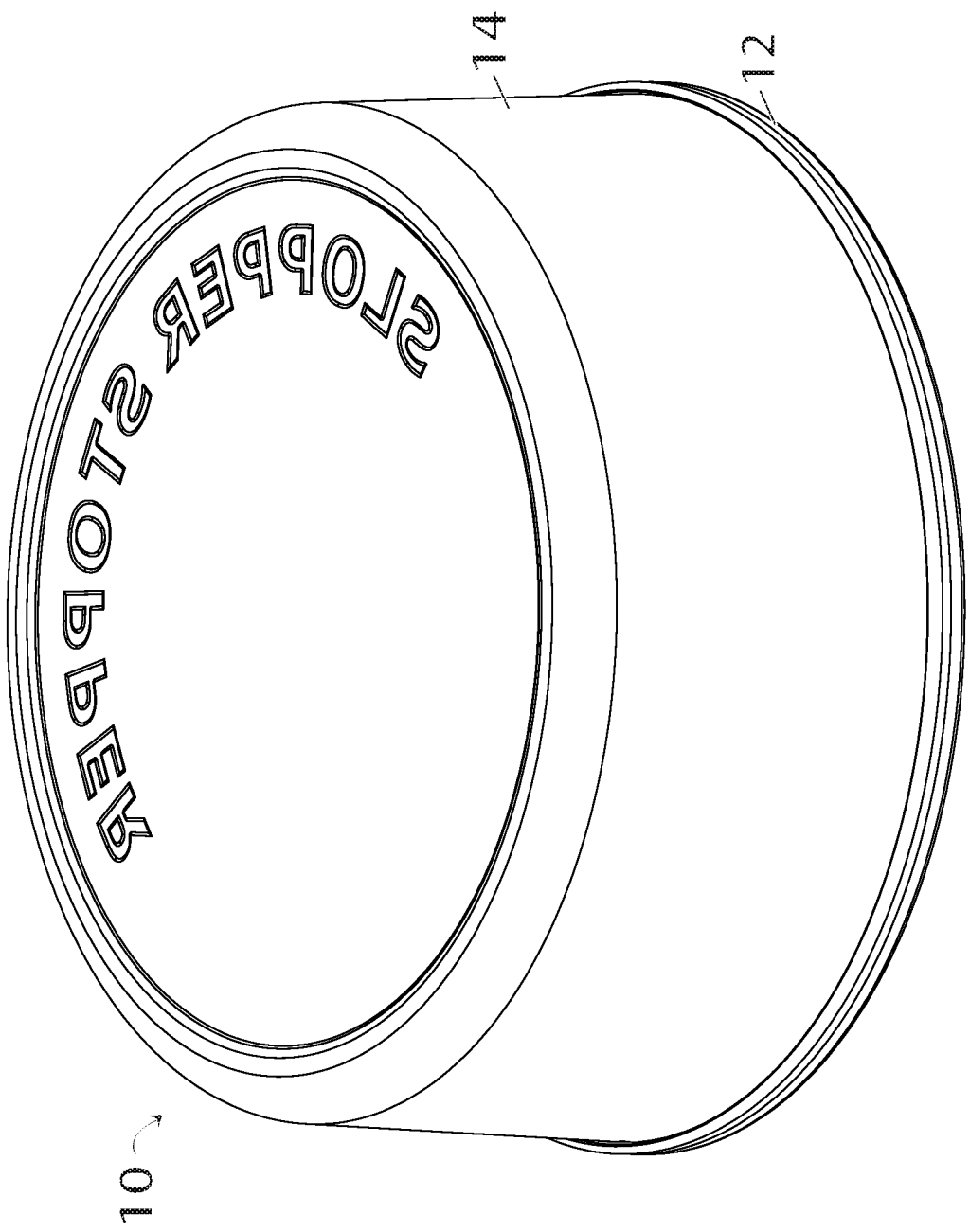
FIG. 3 is a bottom perspective view of the embodiment illustrated in FIG. 1.
Figure 4:
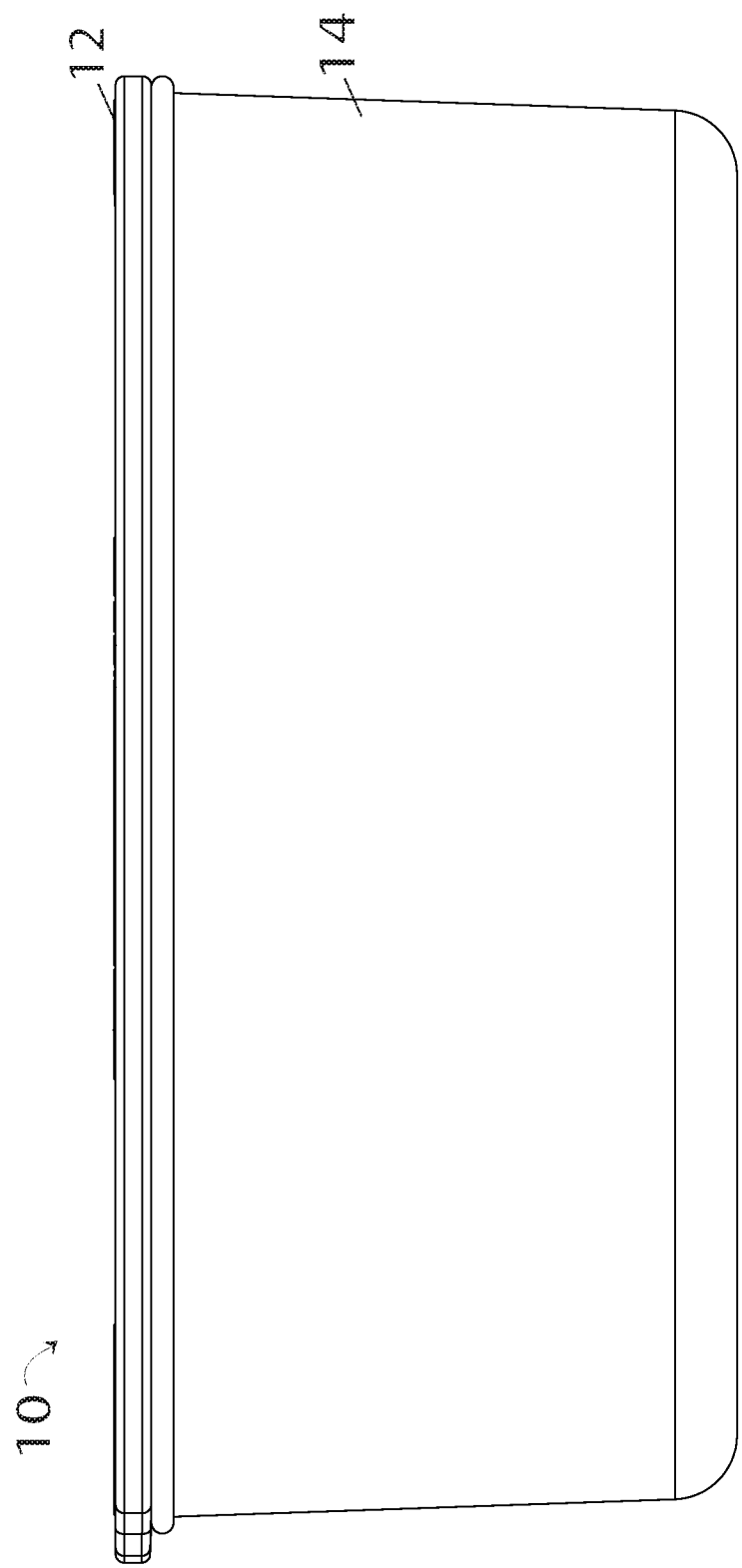
FIG. 4 is a side view of the embodiment illustrated in FIG. 1.
Figure 5:
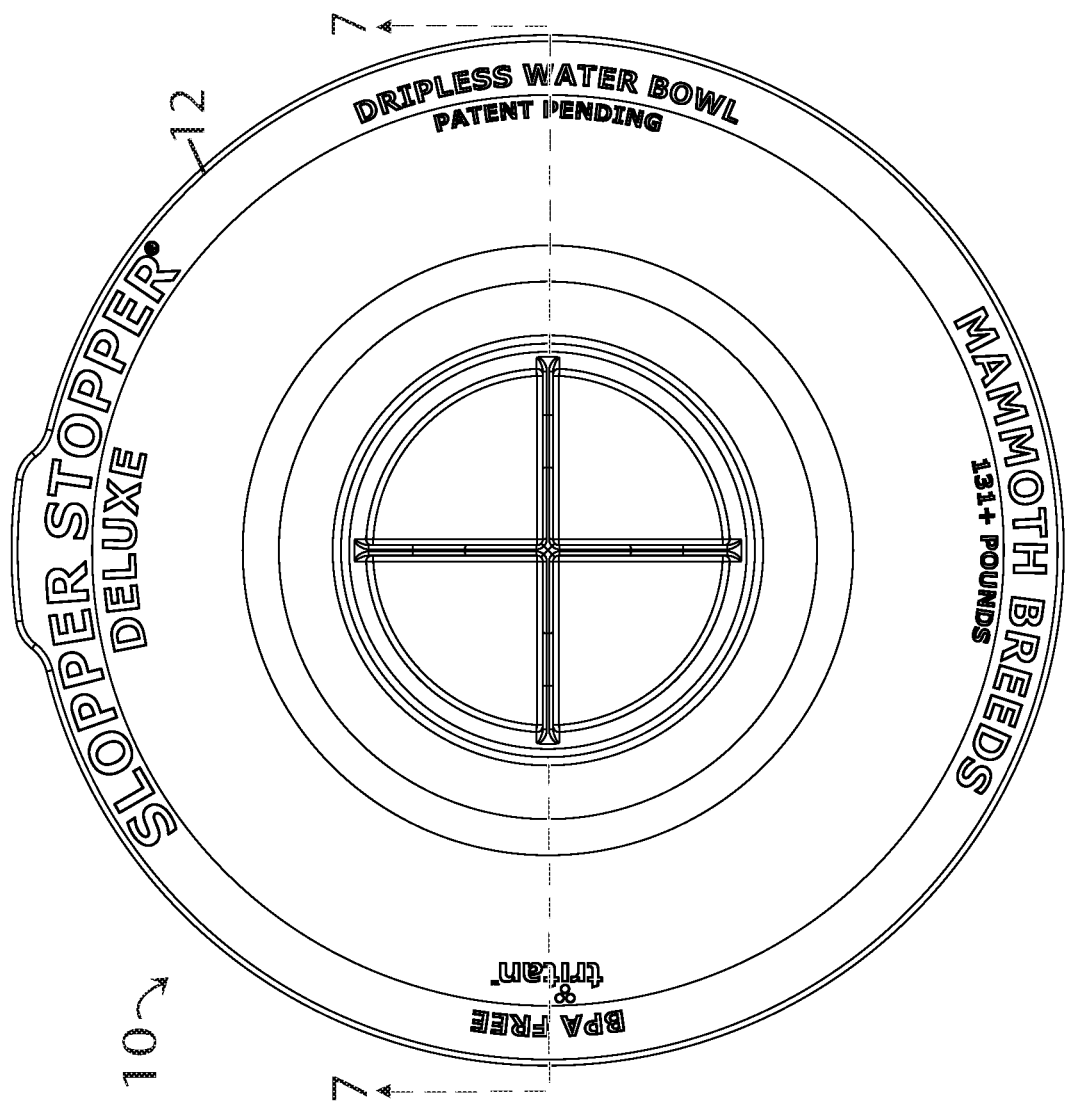
FIG. 5 is a top view of the embodiment illustrated in FIG. 1.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

A drinking container configured to prevent slopping, dripping, or pools of a liquid forming on the surrounding area is provided and referred to generally as a drip preventing container 10. Referring to FIGS. 1-6, the drip preventing container 10 comprises an upper portion 12, illustrated herein as a lid, and a lower portion 14. The upper portion 12 and the lower portion 14 engage with each other to form a sealed, container body configured to hold a liquid therein.

While the instant invention is designed to hold any liquid, the use of water as an illustrative example of a type of liquid will be used throughout the specification, and is not intended to be a limiting example. Moreover, while the figures illustrate the drip preventing container 10 in the preferred rounded or oval shape, such shapes are illustrative only, and therefore, the drip preventing container 10 can be designed in any shape. The drip preventing container 10 may be made of opaque, translucent or transparent materials including plastics such as polyethylene, polypropylene polycarbonate or other thermoplastic polymers, or molded plastics, ceramics, rubber, metals, such as stainless steel, or combinations thereof, as well as any other materials commonly used to make dog bowls. If plastic materials are used, one or all parts of the drool preventing drinking container can be integrally formed through blow-molding techniques or through injection molding techniques.

Figure 6:
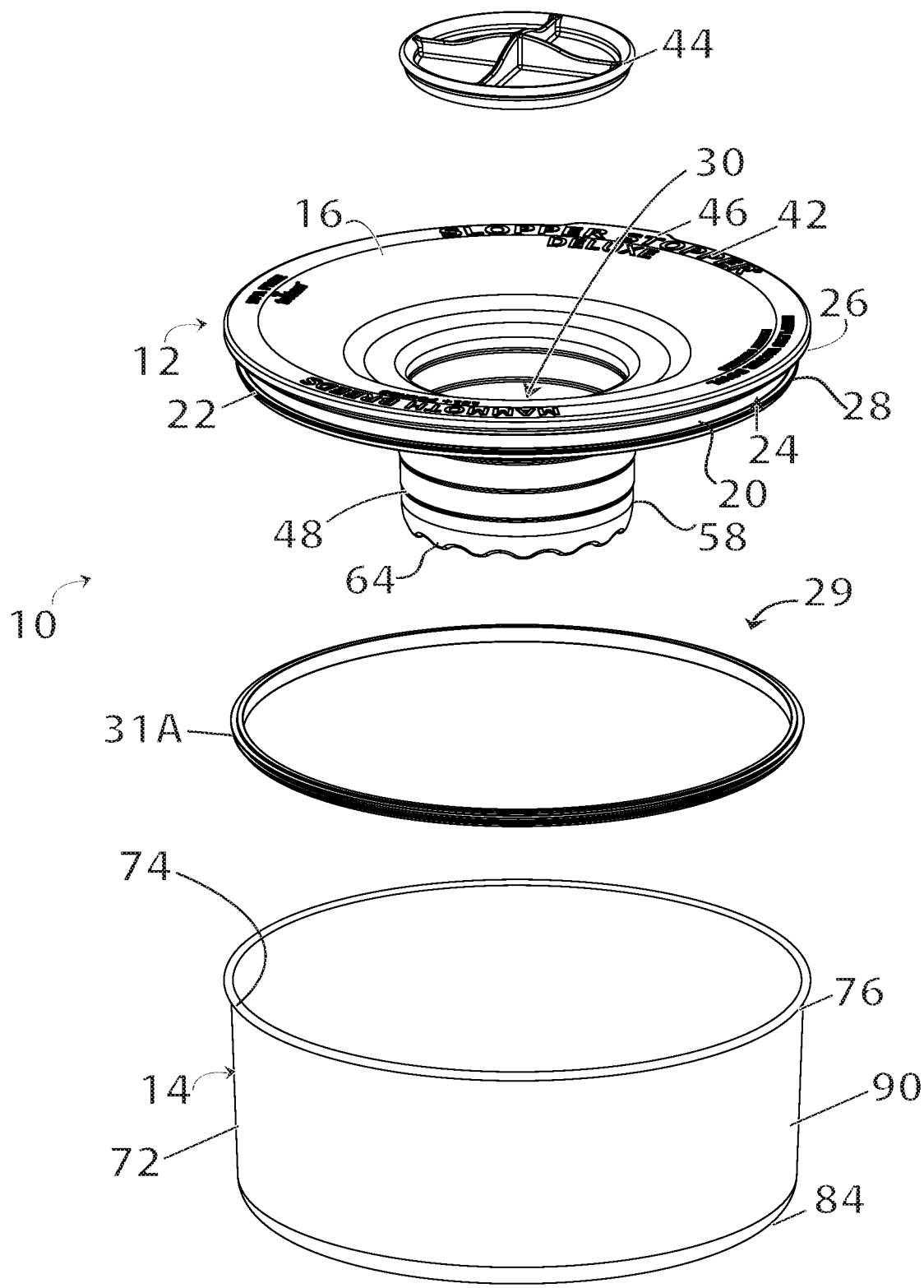
FIG. 6 is an exploded view of the embodiment illustrated in FIGS. 1-5.
Figure 7:
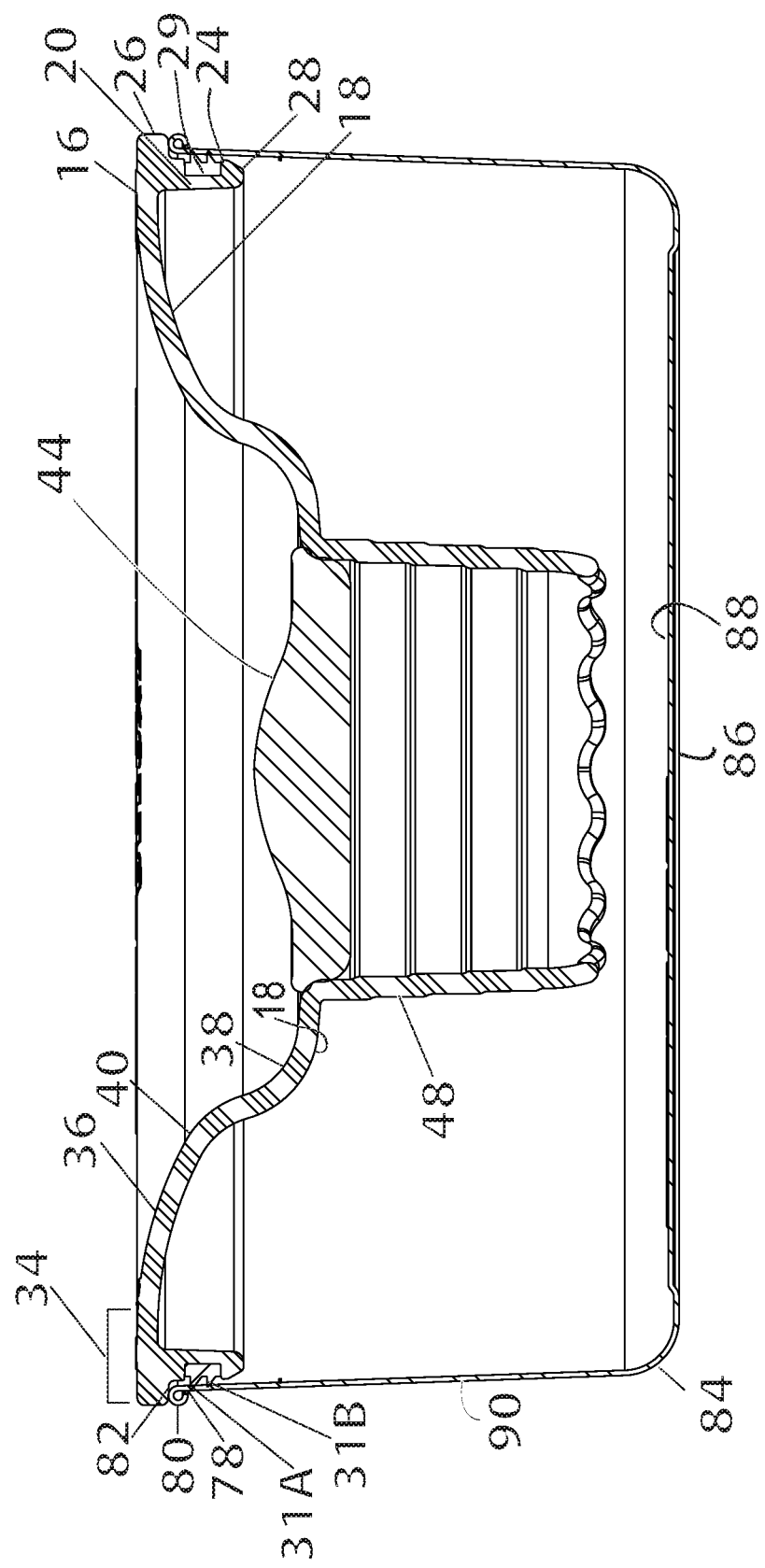
FIG. 7 is a cross-sectional view taken along lines 7-7 of FIG. 5.

Referring to FIG. 6, the upper portion 12 comprises a top surface 16, a bottom surface 18 (shown on FIG. 7), and a continuous side wall 20. The continuous side wall 20 forms an upper portion edge or perimeter 22. The continuous side wall 20 may contain a channel 24 separating a first lip 26 and a second lip 28. The channel 24 is sized and shaped to receive and secure a gasket 29. The gasket 29 may be made of an elastic material. As illustrated in FIG. 7, the gasket 29 contains multiple flanges, 31A and 31B. Gasket 29 is secured to the upper portion edge or perimeter 22 and configured to contact a portion of the lower portion 14, forming a seal between the two surfaces. Accordingly, gasket 29, when in place, prevents liquid from escaping from the drip preventing container 10 when the upper portion 12 is secured to the lower portion 14.

The top surface 16 is configured to allow dogs of different sizes the ability to access water stored inside of the drip preventing container 10 by placing their snout near, or into, a centrally positioned upper portion aperture 30 (see FIG. 2 as well as FIG. 6) and extending their tongue therein. While upper portion aperture 30 is described as being centrally positioned, it may be placed anywhere along the upper portion 12. The top surface 16 may contain a generally flat or planar portion 34, see FIG. 7, which transitions to an inwardly (i.e. towards the center of the upper portion 12) sloping or angled portion or surface 36, terminating at the upper portion aperture 30. The inwardly sloping or angled surface 36 contains both a reversed curved or concave portion 38 positioned adjacent the area where the sloping or angled portion or surface 36 terminates at the upper portion aperture 30. In this configuration, the inwardly sloping surface may comprise a concave surface 40 immediately adjacent the reversed curved or concave portion 38. The concave portion provides a mechanism to allow for dogs of various sized faces (width, wide face or narrow face) to drink form the drip preventing container 10. The top surface 16 may include indicia, 42, (see FIG. 6) such as letters, words, or symbols, etched or formed therein to help a user identify one or more features or characteristics associated with the drip preventing container 10.

To aid in providing pressurization and to prevent liquid from exiting the drip preventing container 10, a pressure plug 44 (see, for example, FIG. 1 or FIG. 6) may be used to cover the upper portion aperture 30. The pressure plug 44 may be made of a silicon rubber, durometer 70A. Such material is illustrative only and not meant to be limiting. The upper portion 12 may also contain a tab portion 46 for aiding in removing the upper portion 12 from the lower portion 14.

Diverging away from the bottom surface 18 of the upper portion 12 is an animal access chamber 48. The animal access chamber 48 may be integrally formed with the upper portion 12 in such a manner that the upper portion aperture 30 defines a first end 50 of the animal access chamber 48, and an animal access chamber aperture 52 defines the second end 54 of the animal access chamber 48. The inclusion of the animal access chamber 48 prevents the animal from obtaining too much water. Extending between the first end 50 and the second end 54 is the animal access chamber main body 56. The animal access chamber main body 56 may be constructed and arranged for reducing the amount of splashing water that exits the container as the animal drinks. The animal access chamber 48 is shown having a generally tubular, cylindrical shape. Such shape, however, is not intended to be limiting. The animal access chamber main body 56 is defined by a wall 58, illustrated herein as a continuous wall, comprising an outer surface 60 and an inner surface 62.

Figure 8:
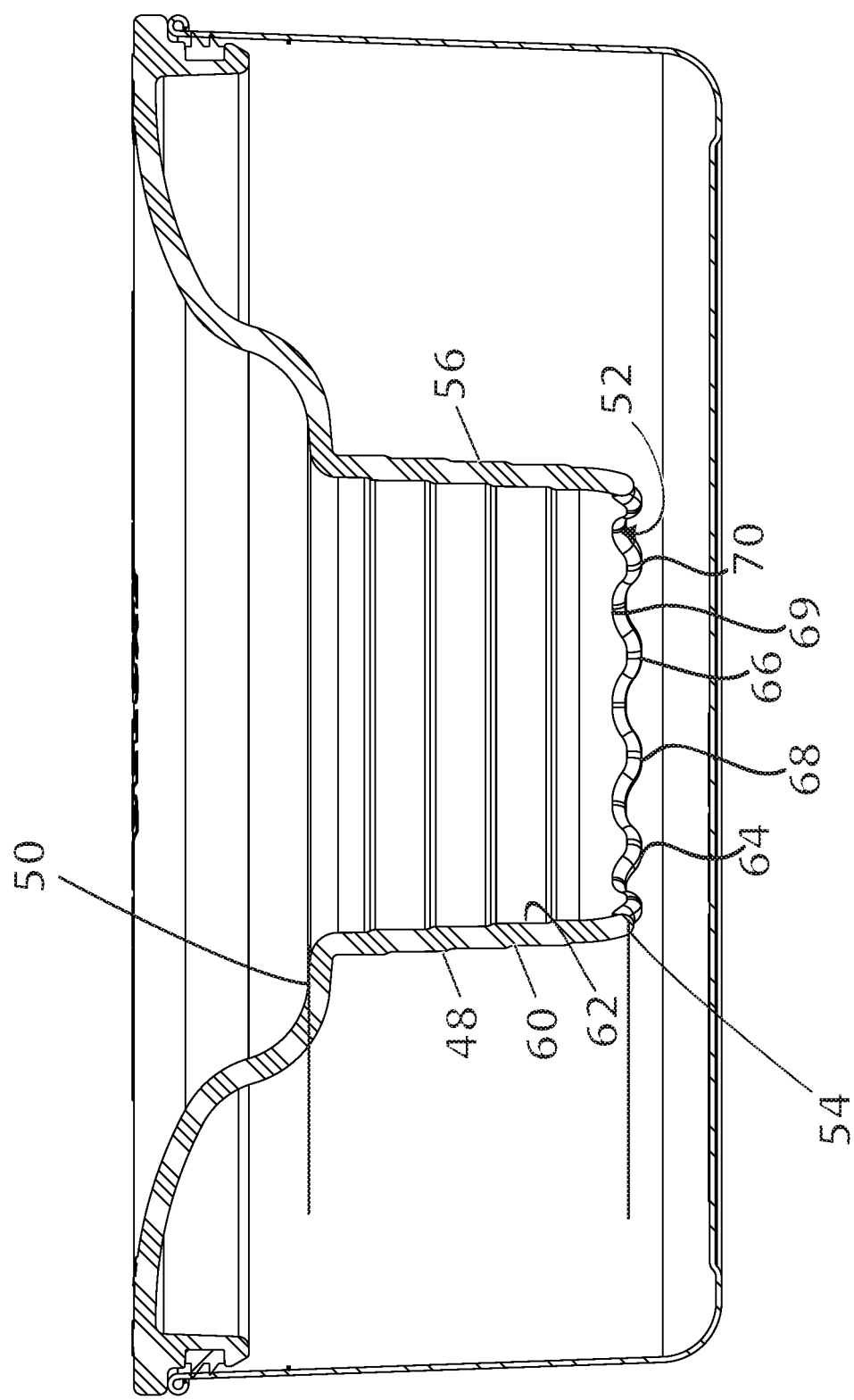
FIG. 8 is a cross-sectional view as shown in FIG. 7, illustrated without the top wall plug.

The second end 54 of the animal access chamber 48 contains edge 64, illustrated herein having a wave-like contour, or scalloping contour 66. The scalloped contour 66 contains a series of curved projections 68 having a series of upper curvatures 69 and lower curvatures 70, see FIG. 8. The length and spacing between the curved projections and/or the upper curvature 69 and a lower curvature 70 can be varied. While such a contour has been found to be a preferred shape to allow for the flow of water from the lower portion 14 to the edge 64 and maintain at that level without filling into the inner surface 62 of the access chamber 48, the contour of edge 64, as illustrated, is not intended to be a limiting example.

Figure 9:
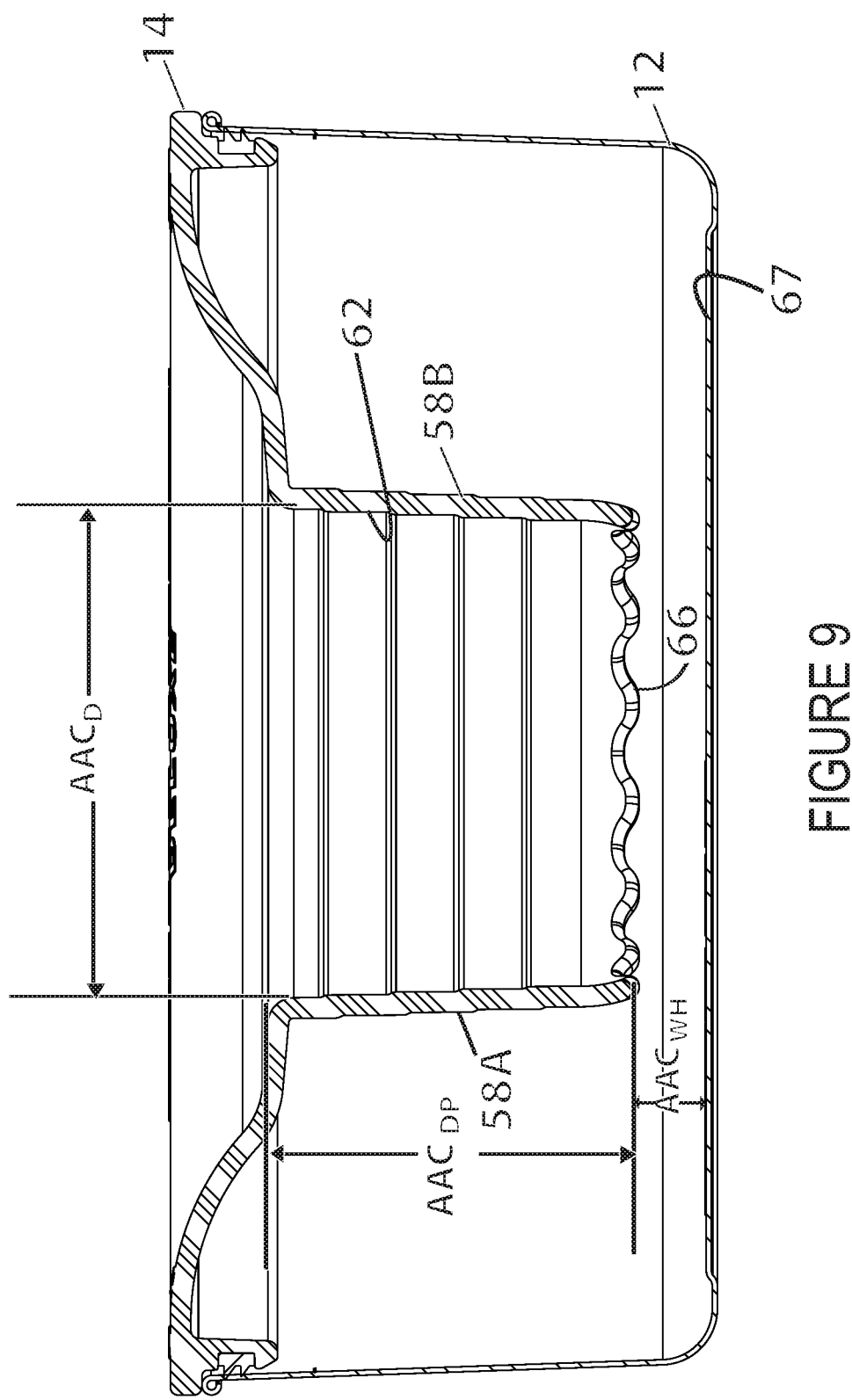
FIG. 9 is a cross-sectional view as shown in FIG. 7, illustrating several animal access chamber characteristics.
Figure 11A:
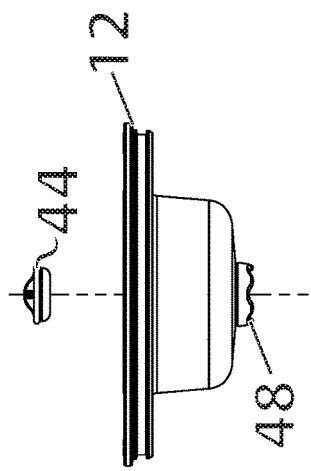
FIG. 11A is a side view of the upper portion of the drip preventing container for use with small breed dogs.
Figure 11B:
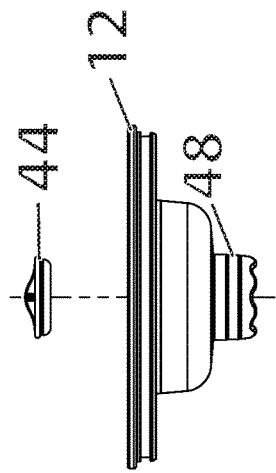
FIG. 11B is a side view of the upper portion of the drip preventing container for use with medium breed dogs.
Figure 11C:
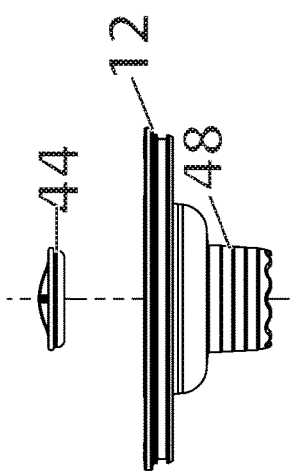
FIG. 11C is a side view of the upper portion of the drip preventing container for use with large breed dogs.
Figure 11D:
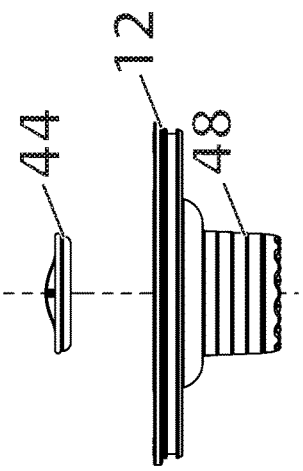
FIG. 11D is a side view of the upper portion of the drip preventing container for use with giant breed dogs.
Figure 11E:
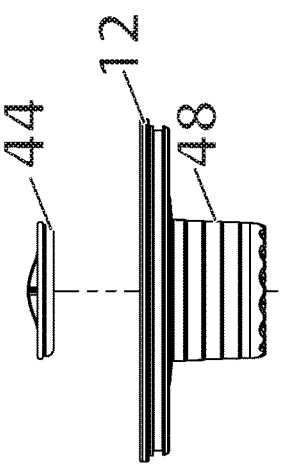
FIG. 11E is a side view of the upper portion of the drip preventing container for use with mammoth breed dogs.

Breed Size formula: $AAC_D$ (X) $AAC_{DP}$ (X) $AAC_{WH}$. Varying several characteristics of the animal access chamber 48 provides a mechanism for providing accurate functionality for different sized dogs. Varying characteristics include at least: 1) an access chamber diameter ($AAC_D$): the diameter, or the distance between two side opposing sidewalls, 58A and 58B, see FIG. 9, as measured from the inner surface 62; 2) animal access chamber depth ($AAC_{DP}$): animal access chamber depth measured by the height of the side wall 58A, measured from the upper most point of the side wall 58A (or 58B)(preferably at the point where upper portion aperture 30 begins) to the lowest point 58A (or 58B); and 3) animal access chamber water height ($AAC_{WH}$): Water Height at base of animal access chamber second end edge 64, defined by the length between the bottom wall 67 of lower portion 14 and the base of scalloping 66. Varying these three parameters allows the upper portion 12 to be varied to accommodate various dog sizes, ranging from small dogs, 2-20 pounds, to mammoth dogs, over 130 pounds, and maintain the same functionality.

Table 1 illustrates the optimal animal access chamber characteristics values (inches) associated with the upper portion 12 for use with various breed sizes. As illustrated by the table, the $AAC_D$ values range from about 1.5 to about 3.75 inches. The $AAC_{DP}$ values range from about 0.66 to about 2.85 inches. The $AAC_{WH}$ values range from about 0.40 to about 0.51 inches. As used herein, with regards to the $AAC_D$, $AAC_{DP}$, and the $AAC_{WH}$ values, the term "about" indicates a value of 1% to 20% above or below the listed value. Varying the animal access chamber diameter:animal access chamber depth:animal access chamber water height ratio, dogs within each category of breeds can utilize the corresponding drip preventing container 10 effectively.

TABLE 1

Animal Access Chamber Characteristics for Various Sized Upper Portions

| | Values in Inches | | |
| --- | --- | --- | --- |
| Breed Size | $AAC_D$ Chamber Diameter/Width | $AAC_{DP}$ Chamber Depth | $AAC_{WH}$ Water Height under Scalloping |
| Small Breeds: 2-20 Lbs. | 1.5 | 0.66 | 0.4 |
| Medium Breeds: 21-45 Lbs. | 2.15 | 1.39 | 0.43 |
| Large Breeds: 46-75 Lbs. | 2.75 | 1.99 | 0.45 |
| Giant Breeds: 76-130 Lbs. | 3.25 | 2.37 | 0.48 |
| Mammoth Breeds: 131+ Lbs. | 3.75 | 2.85 | 0.51 |

Accordingly, the drip preventing container 10 may include an animal access chamber having an animal access chamber diameter:animal access chamber depth:animal access chamber water height ratio of about 1.5 to about 3.75 inches:from about 0.66 to about 2.85 inches:from about 0.40 to about 0.51 inches.

The drip preventing container 10 may include an animal access chamber having an animal access chamber diameter:animal access chamber depth:animal access chamber water height ratio of about 1.5:0.66:0.40 inches.

The drip preventing container 10 may include an animal access chamber having an animal access chamber diameter:animal access chamber depth:animal access chamber water height ratio of about 2.15:1.39:0.43 inches.

The drip preventing container 10 may include an animal access chamber having an animal access chamber diameter:animal access chamber depth:animal access chamber water height ratio of about 2.75:1.99:0.45 inches.

The drip preventing container 10 may include an animal access chamber having an animal access chamber diameter:animal access chamber depth:animal access chamber water height ratio of about 3.25:2.37:0.48 inches.

The drip preventing container 10 may include an animal access chamber having an animal access chamber diameter:animal access chamber depth:animal access chamber water height ratio of about 3.75:2.85:0.51 inches.

Referring back to FIG. 6, the lower portion 14 comprises an outer surface 72 and an inner surface 74. The top end 76 of the lower portion 14 contains a lip 78 with a rounded edge 80, see FIG. 7. The rounded edge 80 is sized and shaped to rest within the seat 82 of the first lip 26 of the upper portion 12. The bottom end 84 of the lower portion 14 provides for a bottom wall 86 having an inner surface 88. Connecting the top end 76 and the bottom end 84 is a side wall 90. Side wall 90 is shown as a continuous side wall. A bottom wall 86 forms the floor of the device. The top end 76 is open, which in combination with the bottom wall 86 and continuous side wall 90 provides for a partially enclosed lower portion that forms the liquid holding reservoir for enclosing various liquids, such as water, or nutritional solids, such as food.

Figure 13:
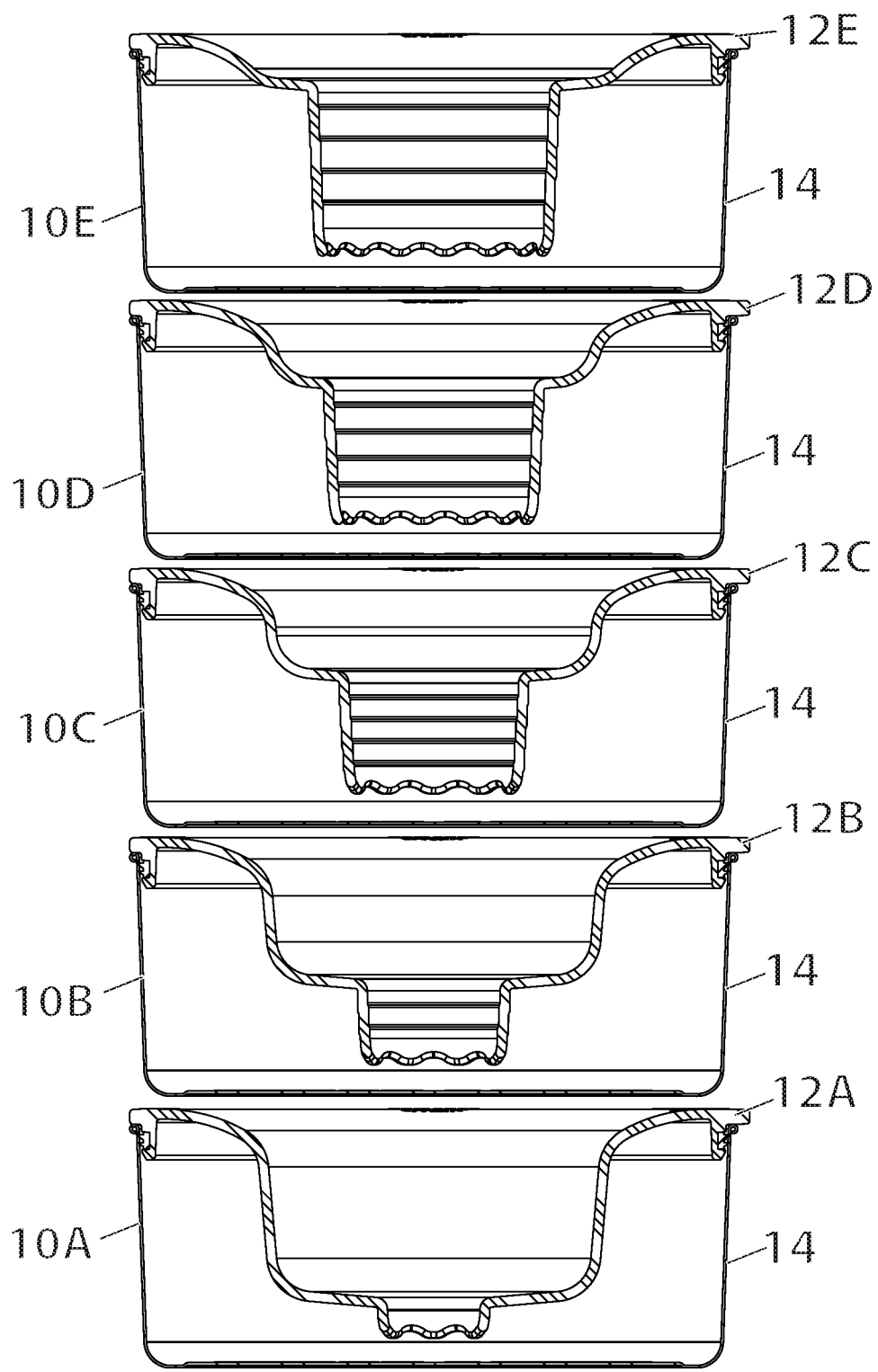
FIG. 13 illustrates cross sectional views of plurality of drip preventing containers sized for different dog breeds in a stacked orientation.

FIGS. 10A-10E illustrate the drip preventing container 10 adaptable for use with various dog breeds of various sizes. The upper portions illustrated in 10A-10E are engageable with the lower portion 14 and are designed to provide drip preventing containers 10 which can be used for small breed dogs, 10A, medium breed dogs, 10B, large breed dogs, 10C, giant breed dogs, 10D, and mammoth breed dogs 10E. By varying one or more of the animal access chamber characteristics described above, dogs within each category of breeds can utilize the corresponding drip preventing container 10 effectively. More specifically, varying the animal access chamber ratio of diameter:animal access chamber depth:animal access chamber water height within each category of breeds can utilize the corresponding drip preventing container 10 effectively. FIGS. 11A-11E (side views) and 12A-12E (cross sectional views) illustrate the effects of varying the animal access chamber diameter:animal access chamber depth:animal access chamber water height ratio. FIG. 13 illustrates the various corresponding drip preventing drinking containers, in cross sectional view and attached to the bottom portion 14, in a stacked orientation. Each drip preventing container 10 and upper portion 12 is labeled with a corresponding letter to indicate the size breed the container's intended use is for: small breed dogs, 10A/12A, medium breed dogs, 10B/12B, large breed dogs, 10C/12C, giant breed dogs, 10D/12D, and mammoth breed dogs 10E/12E.

Use of the drip preventing container 10 is not limited to a particular size dog breed. Such capability provides several advantages. First, the drip preventing container 10 is configured to provide or supply the correct amount of water at the bottom of the reservoir for different breed sizes that allows the dog to get just enough water to drink. This prevents the dog from obtaining too much water and preventing dripping water from the animal's mouth after the animal consumes the water and walks away from the bowl. Second, the drip preventing container 10 design keeps the dog's snout, and hence hairy beards, out of the water and dry. In addition, the drip preventing container 10 prevents the dog's ears from getting wet, which is another reason the dogs drip water all over the floor. Finally, the drip preventing container 10 design provides a mechanism to slow down the drinking process. Slowing down the drinking process prevents drip from the dogs' mouth to the floor, which results from the dog ingesting too much water.

Varying the animal access chamber ratio of diameter:animal access chamber depth:animal access chamber water height allows different sized breeds to utilize the drip preventing container 10 with the same functionality, i.e. maintaining a continuous water supply accessed through the animal access chamber 48, but limiting the amount of liquid obtained per lick, thereby preventing or limiting excess water which can drip to a surrounding area from forming. In use, the upper portion 12 is removed from the bottom portion 14 and filled with water. Once filled with the proper volume of water, the upper portion 12 with the pressure plug 44 inserted within the upper portion aperture 30, is placed on top of the bottom portion 14 and secured thereto. The drip preventing container 10 is completely enclosed. As the upper portion 12 is secured to the bottom portion 14, the secured pressure plug 44 limits the amount of water entering the animal access chamber 48. The level of water stored within the animal access chamber 48 is minimal, and is at a level that is lower than the amount of water stored within the bottom portion. Any water that was originally within the animal access chamber 48, prior placement of the upper portion 12 thereto, is then displaced to the area around the animal access chamber 48.

Once the upper portion 12 is secured to the lower portion 14 and the water is in the proper place, the secured pressure plug 44 is removed from the animal access chamber 48. Removal of the pressure plug 44 allows for the drinking process to begin as the animal has access to animal access chamber 48 and the drip preventing container 10 can operate properly. The pressure plug 44 when inserted within the animal access chamber maintains the water at the bottom of the scalloping by pressuring the animal access chamber 48 when attaching the upper portion 12. This positions the water at the correct starting position, i.e. at the bottom of the scalloping. Once the animal begins the drinking process, water is continuously accessible to the animal at the level at or slightly below edge 64. As a result of the construction of the animal access chamber 48, the surface tension between the water and the edge 64 of the animal access chamber 48, the internal vacuum formed within the device, and/or the airtight or pressurized enclosure, the water level remains at a fixed level and does not enter into the animal access chamber 48.

Once filled and properly sealed, the drip preventing container 10 is ready for use by a thirsty dog. Limited amounts of water may be obtained by the dog by placing the animal's face within the generally flat region 34, the inwardly sloping region 36, and the concave region 38 of the upper portion 12. As the water level flows from the bottom portion 14 to the animal access chamber 48, an equilibrium level at or below the edge 64 is maintained. Such action prevents water from entering within the inner part of the animal access chamber 48, reducing the chance that the animal has access to a large pool of water from which to obtain water. This action further prevents the animal from obtaining a large amount of liquid per lick, thereby preventing or limiting dripping or pools of water forming to the surrounding area. As long as the dog continues to drink, water will continuously be available to the animal through the animal access chamber 48. The amount of water accessible to the animal as it drinks, however, is limited because water does not fill the chamber or seek equilibrium levels with the bottom portion 14.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that, while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:
1. A drip preventing container for dispensing limited amounts of a liquid to an animal comprising:

an upper portion constructed and arranged to sealably engage a bottom portion, said upper portion having an aperture and comprising a generally planar surface which transitions to an inwardly sloping or angled surface terminating at said aperture, said inwardly sloping or angled surface comprising a concave portion positioned adjacent where said sloping or angled surface terminates at said upper portion aperture;

a bottom portion defined by a first open end constructed and arranged to sealably engage said upper portion, a second end defined by a bottom wall, and a side wall linking said first open end and said bottom wall to define a reservoir for holding a liquid; wherein sealable engagement of said upper portion with said bottom portion defines a drip preventing container constructed and arranged for providing an animal access to a limited amount of liquid stored within said reservoir for holding a liquid, thereby preventing or limiting liquid formation outside of said drip preventing container;

an animal access chamber having a main body defined by a first end extending from said upper portion aperture, a second end positioned towards said bottom wall of said bottom portion and terminating in an animal access chamber aperture, and a side wall therebetween, said main body constructed and arranged to prevent said excess liquid from exiting the drip preventing drinking container as the animal drinks.

2. The drip preventing container for dispensing limited amounts of a liquid to an animal according to claim 1 wherein said animal access chamber is defined by an animal access chamber diameter, an animal access chamber depth, and an animal access chamber water height.

3. The drip preventing container for dispensing limited amounts of a liquid to an animal according to claim 2 wherein said animal access chamber is defined by an animal access chamber diameter:animal access chamber depth:animal access chamber water height ratio.

4. The drip preventing container for dispensing limited amounts of a liquid to an animal according to claim 3 wherein said animal access chamber diameter:animal access chamber depth:animal access chamber water height ratio is about 1.5 to about 3.75 inches:from about 0.66 to about 2.85 inches:from about 0.40 to about 0.51 inches.

5. The drip preventing container for dispensing limited amounts of a liquid to an animal according to claim 4 wherein said animal access chamber diameter:animal access chamber depth:animal access chamber water height ratio is about 1.5:0.66:0.40 inches.

6. The drip preventing container for dispensing limited amounts of a liquid to an animal according to claim 4 wherein said animal access chamber diameter:animal access chamber depth:animal access chamber water height ratio is about 2.15:1.39:0.43 inches.

7. The drip preventing container for dispensing limited amounts of a liquid to an animal according to claim 4 wherein said animal access chamber diameter:animal access chamber depth:animal access chamber water height ratio is about 2.75:1.99:0.45 inches.

8. The drip preventing container for dispensing limited amounts of a liquid to an animal according to claim 4 wherein said animal access chamber diameter:animal access chamber depth:animal access chamber water height ratio is about 3.25:2.37:0.48 inches.

9. The drip preventing container for dispensing limited amounts of a liquid to an animal according to claim 4 wherein said animal access chamber diameter:animal access chamber depth:animal access chamber water height ratio is about 3.75:2.85:0.51 inches.

10. The drip preventing container for dispensing limited amounts of a liquid to an animal according to claim 1 further comprising a liquid filling structure plug sized and shaped to engage with said upper portion aperture.

11. The drip preventing container for dispensing limited amounts of a liquid to an animal according to claim 1 further comprising a gasket secured to an upper portion perimeter edge, said gasket configured to contact a portion of the bottom portion and form a seal between the said upper portion perimeter edge and said bottom portion.

12. The drip preventing container for dispensing limited amounts of a liquid to an animal according to claim 1 wherein said second end of said animal access chamber has a scalloped edge.

13. A drip preventing container for dispensing limited amounts of a liquid to an animal comprising:

an upper portion constructed and arranged to sealably engage a bottom portion, said upper portion comprising a generally planar surface which transitions to an inwardly sloping surface terminating at a centrally positioned aperture, said inwardly sloping surface comprising a concave portion positioned adjacent where said sloping surface terminates;

a bottom portion defined by a first open end constructed and arranged to sealably engage said upper portion, a second end defined by a bottom wall, and a side wall linking said first end and said bottom wall to define a reservoir for holding a liquid; wherein sealable engagement of said upper portion with said bottom portion defines a drip preventing container constructed and arranged for providing an animal access to a limited amount of liquid stored within said reservoir for holding a liquid, thereby preventing or limiting liquid formation to an area surrounding said drip preventing container as said animal drinks therefrom; and an animal access chamber comprising a main body constructed and arranged to prevent said excess liquid from exiting the drip preventing drinking container as the animal drinks, said main body having a first end extending from said upper portion aperture, a second end positioned towards said bottom wall of said bottom portion and terminating in an aperture, and a side wall therebetween, said animal access chamber is defined by an animal access chamber diameter:animal access chamber depth:animal access chamber water height ratio.

14. The drip preventing container for dispensing limited amounts of a liquid to an animal according to claim 13 wherein said animal access chamber diameter:animal access chamber depth:animal access chamber water height ratio is about 1.5 to about 3.75 inches:about 0.66 to about 2.85 inches:about 0.40 to about 0.51 inches.

* * * * *